United States Patent Office 3,281,333
Patented Oct. 25, 1966

3,281,333
PROSPECTING FOR PETROLEUM DEPOSITS
Donald O. Hitzman, Bartlesville, Okla., assignor to Phillips Petroleum Company, a corporation of Delaware
No Drawing. Filed Sept. 17, 1964, Ser. No. 397,294
8 Claims. (Cl. 195—103.5)

This invention relates to a method of prospecting for petroleum deposits. In one aspect this invention relates to microbiological prospecting for subterranean oil and gas deposits.

It is an established bacteriological fact that bacteria are adaptive organisms and can serve as indicators for specific environmental conditions. Microbiological prospecting is based on the theory that hydrocarbon gases have been continually escaping from oil and gas deposits and pervade the surface soils. Said gases permeate and provide an atmosphere in the soil below surface contamination which atmosphere, in the past, has been selective in determining the microbiological growth which can exist in said atmosphere or environment. This selectivity results in a biological population in the soil which utilizes these hydrocarbon gases and which can grow only in their presence. The presence of these environmental selective microorganisms is indicative of the presence of the hydrocarbon gases in the soil and thus indicates the presence of subterranean oil and gas deposits. Samples of soil taken over a hydrocarbon-bearing formation will contain more hydrocarbon-consuming microorganisms than samples of soil taken from a "dry" area. Microbiological prospecting can thus function as an aid to conventional methods of prospecting (geological, geophysical, etc.) by indicating the presence or absence of hydrocarbon deposits in a favorable formation located by one of the conventional methods of prospecting or by delineating the boundaries of a known hydrocarbon deposit. For example, microbiological prospecting can be employed to delineate the boundaries of a newly discovered oil pool.

Many methods of microbiological prospecting have been proposed. In practically all of said methods, soil samples are gathered from the area under investigation and processed in one way or another to produce a qualitative indication of the presence or absence of hydrocarbon gases in the soil. So far as is presently known, none of the proposed methods have been successful to the degree that it has been adopted to any great extent on a commercial basis. This is believed to be due primarily to the methods of analysis having inherent limitations as to accuracy and also to requirements for specific apparatus and techniques not readily adapted for use in field laboratories.

In U.S. Patent 2,880,142, issued March 31, 1959, of which I am the inventor, there is described the discovery that hydrocarbon-consuming bacteria can readily adapt to the presence of certain organic liquids normally toxic to most microorganisms. Said patent also describes the discovery that an accumulation of hydrocarbon-consuming microorganisms in the soil can be revealed by exposing and growing said microorganisms in the presence of certain organic liquids normally toxic to most microorganisms. Based on these discoveries, there is disclosed and claimed in said patent a method of prospecting for subterranean oil and gas deposits utilizing ordinary laboratory equipment and a technique which is readily adapted for use in small portable field laboratories. Said method of prospecting gives more accurate and reproducible results than have been possible by the methods of the prior art. Broadly speaking, the invention disclosed and claimed in said patent comprises exposing the hydrocarbon-consuming microorganisms in soil samples from the area under investigation to an aliphatic alcohol containing not more than four carbon atoms per molecule as a substrate in a culture medium under incubating conditions for a period of time sufficient to permit the propagation and growth of the microorganisms, and then counting the number of colonies of said microorganisms which develop.

I have now discovered that certain phenolic compounds (defined further hereinafter) can be utilized as the organic liquid which is normally toxic to most microorganisms and to which said hydrocarbon-consuming microorganisms can adapt. It was surprising that the aromatic phenolic compounds could be so utilized. Prior to the present invention it was considered that said organic liquid must be a straight chain aliphatic compound, and preferably a straight chain aliphatic compound having the same carbon chain length as the released hydrocarbon gases most commonly found in the soil. Thus, since the hydrocarbon gases most commonly found in the soil are aliphatic straight chain compounds having from 1 to 4 carbon atoms per molecule, it was indeed surprising that an aromatic compound could be utilized as in the practice of this invention. It was even more surprising when, as shown hereinafter, it was discovered there is no need for said aromatic compound to contain an aliphatic side chain.

Thus, broadly speaking, the present invention resides in exposing hydrocarbon-consuming microorganisms in soil samples from an area under investigation to the action of certain phenolic compounds (defined further hereinafter), which are normally toxic to most microorganisms, under incubating conditions for a period of time sufficient to promote the propagation and growth of the microorganisms, and then counting the number of colonies of said microorganisms which developed.

An object of this invention is to provide a method of microbiological prospecting for subterranean oil and gas deposits. Another object of this invention is to provide a method of prospecting for subterranean oil and gas deposits by means of which it is possible to locate said deposits without regard to the geological structure in which said deposits occur. Another object of this invention is to provide a method of prospecting for subterranean oil and gas deposits by means of which the boundaries of a known deposit of oil and/or gas can be delineated. Still another object of this invention is to provide a method of microbiological prospecting for subterranean oil and gas deposits wherein samples of soil from the area under investigation are analyzed for a direct measurement of the hydrocarbon-consuming microorganisms present at the time of sampling. Still another object of this invention is to provide a method of microbiological prospecting for subterranean oil and gas deposits wherein the sources of error common to the methods of the prior art are eliminated. Another object of this invention is to provide a method of microbiological prospecting for subterranean oil and gas deposits which is readily adapted for use in small portable field laboratories. Other aspects, objects and advantages of the invention will be apparent to those skilled in the art in view of this disclosure.

Thus, according to the present invention, there is provided a method of prospecting for subterranean oil and gas deposits wherein samples of soil from spaced points in the area under investigation are analyzed for the presence of hydrocarbon-consuming microorganisms whose presence is indicative of subterranean oil and gas deposits, the improvement which comprises: subjecting an aliquot portion of each of said samples to the action of a phenolic compound selected from the group consisting of phenolic compounds characterized by the following structural formulas

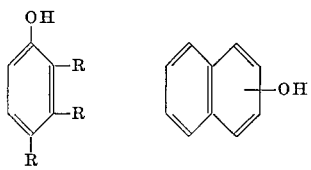

wherein each R is selected from the group consisting of a hydrogen atom, an OH group, and a methyl group, and not more than one R is other than hydrogen, as a substrate in a culture medium under incubating conditions for a period of time sufficient to permit growth of said microorganisms; and examining said culture medium for evidence of said growth.

It is to be noted that the phenolic compound to which the microorganisms are subjected is one which is normally toxic to microorganisms and which kills most bacteria. However, as mentioned above, some microorganisms can readily adapt themselves to utilize the released hydrocarbon gases as their primary source of nutrient. These same microorganisms can readily adapt to utilize said phenolic compound. In the practice of the invention, said phenolic compound is included as the sole substrate in a culture medium devoid of other sources of carbon. Thus, in order for propagation and growth to occur, the microorganisms must utilize the phenolic compound as a nutrient. Aliquots of the soil sample are added to the culture medium in a culture dish, incubated and the number of colonies of microorganisms which develop are counted. Since the hydrocarbon-consuming microorganisms are the only ones which can readily adapt to the phenolic compound, the higher the number of colonies, the more indication of the presence of an oil and/or gas deposit.

Suitable phenolic compounds which can be utilized in the practice of the invention include, among others, the following: phenol, o-cresol, m-cresol, p-cresol, pyrocatechol, resorcinol, pyrogallol, hydroquinone, 1-naphthol, and 2-naphthol.

Any suitable method of taking soil samples which will provide representative samples from the area to be investigated can be employed in the practice of the invention. In one preferred method soil samples are secured from the area under investigation from different depths below the surface, depending to some extent upon the moisture content of the soil and the season of the year. In any event, it is preferred that the soil sample be taken at a sufficient depth below the surface to avoid surface contamination. Depths from six inches to three feet are usually preferred, with depths of from one to three feet being more preferred. In taking the samples, it is important that the soil sample be a sample of undisturbed soil at the desired depth. One convenient method of sampling is to dig a hole with the aid of an ordinary posthole digger to approximately the desired depth and then by the use of a hand auger, take a sample of undisturbed soil from the side of the hole at the desired depth. The area under investigation is usually sampled according to a pre-arranged plot of said area. Obviously any desired plot can be employed. The number of sampling stations and the number of samples taken at each station will usually depend upon the size of the area under investigation. For example, if a large area is being investigated, two holes ten feet apart are dug and a sample taken from each hole.

The samples are preferably placed in suitable sterile glass containers. Later, one hundred grams of soil from each hole are blended to give a two hundred gram sample for each sampling station. For smaller areas single samples from more closely spaced holes, e.g., five feet apart, can be taken.

According to one preferred method, the sample of soil is then blended in a Waring blendor or other suitable mixing device for approximately one minute with 1,000 milliliters of a sterile mineral medium having the following composition:

MINERAL MEDIUM NO. 1

| | | |
|---|---|---|
| $NH_4NO_3$ | grams | 1.0 |
| $M_gSO_4$ | do | 0.1 |
| $K_2HPO_4$ | do | 0.5 |
| $CaSO_4$ | do | 0.1 |
| Distilled water | ml | 1000 |

The pH of the soil suspension is then adjusted to 7 while the suspension is being agitated. One milliliter of the soil suspension is then added to 100 milliliters of said sterile mineral medium to give a 1 to 100 dilution soil suspension. One milliliter of the 1 to 100 dilution is then added to 100 milliliters of the mineral medium to give a 1 to 10,000 dilution soil suspension.

The mineral medium which is used in preparing the above-described soil suspensions and dilutions can be varied widely as is well known to bacteriologists. One other such mineral medium which can be used consists of:

MINERAL MEDIUM NO. 2

| | | |
|---|---|---|
| $NH_4Cl$ | grams | 1.0 |
| $K_2HPO_4$ | do | 0.5 |
| $M_gNH_4PO_4$ | do | 0.5 |
| $CaSO_4$ | do | 0.1 |
| Distilled water | ml | 1000 |

Duplicate cultures at the desired dilutions are prepared from each of the 1 to 100 dilution soil suspension and the 1 to 10,000 dilution soil suspension by incorporating aliquot portions of each suspension into a culture medium, such as an agar medium, in a Petri dish. A suitable agar medium consists of:

| | | |
|---|---|---|
| $NH_4NO_3$ | grams | 1.0 |
| $M_gSO_4$ | do | 0.1 |
| $K_2HPO_4$ | do | 0.5 |
| $CaSO_4$ | do | 0.1 |
| Agar | do | 15.0 |
| Distilled water | ml | 1000 |

The phenolic compound of the invention, such as phenol, is incorporated into the agar medium and serves as the sole substrate or nutrient in the culture medium. The amount of phenolic compound used in the agar medium in all instances is an amount which is sufficient to serve as a nutrient for the hydrocarbon-consuming microorganisms which are to be cultured, but which is insufficient to be toxic to said microorganisms. Usually the amount of said phenolic compound utilized in the practice of the invention will be an amount within the range of from 5 to 100, preferably 10 to 50, parts by weight per million parts by weight of said agar culture medium.

The prepared plates are allowed to solidify and are then incubated in an inverted position at about 37° C. for six days after which time they are removed from the incubator and the colonies which have developed are counted. If desired, shorter incubation periods, e.g., 3 to 4 days, or longer incubation periods, e.g., 8 to 12 days, can be employed.

Any number of cultures can be prepared. However, as a general rule, I have found it convenient to prepare at least two cultures at two different dilutions. For example, two dishes are prepared at a 1 to 1000 dilution and two dishes are prepared at the 1 to 10,000 dilution.

Usually, when hydrocarbon-consuming microorganisms are present, at least one of the dishes will develop a number of colonies which is within the counting range. The colonies in the culture dishes which develop colonies within the counting range are then counted and averaged to give the number of colonies for the sample being tested.

Other methods of sample preparation and culture preparation can be employed in the practice of the invention. The specific example given hereinafter illustrates a modification of the above-described procedures which has been found to give excellent results.

The following example will serve to further illustrate the invention.

*Example*

A butane microseep area was prepared as follows: An area approximately 45 feet x 15 feet was treated for a period of more than one year with butane by allowing butane to slowly seep into the soil from distributors buried at a depth of 10 feet. Soil gas samples taken at 12-inch depth at spaced locations in this butane microseep area and analyzed by gas chromatography showed an average of approximately 5 to 10 p.p.m. butane in the soil gas.

In said butane microseep area, 10 soil samples were taken at stations spaced 5 feet apart and at a depth of 12 inches. In another adjacent area where butane was not identified in the soil gas, 10 samples were taken at stations spaced 5 feet apart and at 12-inch depth. Cultures of each of said 20 samples were prepared as follows: 25 grams of soil sample was added to 100 cc. of the above Mineral Medium No. 1 and shaken until dispersed. One cc. of the resulting first suspension was added to 100 cc. of said Mineral Medium No. 1 and shaken until dispersed. One cc. of this second suspension was added to 100 cc. of said Mineral Medium No. 1 and shaken until dispersed. One cc. of this third suspension was added to approximately 12 cc. of the above-described agar medium using phenol as the sole substrate. The prepared dishes were allowed to solidify and were then incubated for six days at 37° C. after which time they were removed and the colonies which developed were counted. The parts per million of phenol used in each instance and the results of the colony counts are given in Table I below. In said Table I the samples from the butane microseep area are identified as "On field" and the samples from the adjacent area where the soil gas contained no butane are identified as "Off field." In each instance the colony count values shown are the average of the 10 cultures prepared from the 10 soil samples at each phenol concentration.

TABLE I

| Colony Counts—Average No. per ml. (× 10,000) at phenol concentration of— | | | | | | | |
|---|---|---|---|---|---|---|---|
| 10 p.p.m. | | 50 p.p.m. | | 100 p.p.m. | | 500 p.p.m. | |
| On field | Off field | On field | Off field | On field | Off field | On field | Off field |
| 41 | 23 | 33 | 23 | 24 | 21 | 9 | 7 |

The data set forth in the above Table I show that hydrocarbon-consuming bacteria can readily adapt to utilizing phenolic compounds as nutrients. Said data also demonstrate the value of the invention in prospecting for subterranean oil and/or gas deposits and in delineating the boundaries of said deposits.

It is to be understood that the invention is not to be limited by the above-described sampling procedures. Obviously any suitable sampling procedure can be employed and the above-suggested procedures are given for illustrative purposes only. However, it is to be noted that if the sampling procedure is to be varied, the precautions pointed out above should be observed.

It is a feature of my invention that it is readily adapted for use in the field. Thus, the preferred procedure is that a truck or trailer be equipped as a portable field laboratory and the collected samples taken directly to said laboratory and tested without delay after collecting. This, of course, gives the most reproducible results. However, as a practical matter, I have found that if the samples are tested within twenty-four hours after collection, results are obtained which can be reproduced with a high degree of accuracy. If for some reason the samples cannot be tested within twenty-four hours after collection, it is desirable that the samples be stored under refrigeration, for example, at a temperature of about 40 to 46° F. until tested.

The above-described procedures for the preparation of the dilute soil suspensions are given for illustrative purposes only. As will be understood by bacteriologists, such procedures can be widely varied. The same is true for the procedure described in preparing the culture dishes.

As mentioned, the method of my invention gives results which are more accurate and reproducible than the methods of the prior art. When employing my method using soil suspensions of high dilution, the microorganisms are effectively isolated from all sources of carbon, such as in the soil sample itself, except the carbon which is present in the phenolic substrate (the dishes are incubated in air which contains carbon dioxide). Another advantage of employing the highly diluted soil suspensions and the plate method of culture is that the actual number of organisms present in an aliquot portion of the soil sample at the time of sampling is measured, i.e., each microorganism in the aliquot of the sample grows into a colony of microorganisms and a count of the colonies which develop gives a direct account of the microorganisms present in the soil at the time of sampling. In the methods of the prior art, when using the hydrocarbon utilization technique, the microorganisms in the sample are cultured in an atmosphere of the hydrocarbons plus oxygen and great numbers of microorganisms must be developed. Sufficient time must be allowed for enough microorganisms to develop so that the amount of hydrocarbon gas utilized can be measured with some degree of accuracy. If leaks occur in the system erroneous results will be obtained. Another source of error is consumption of oxygen from the hydrocarbon gas mixtures by microorganisms other than hydrocarbon-consuming microorganisms which may be present in the soil sample. Thus, it is seen that such methods create an artificial condition which introduces variable factors which can lead to unreliable results.

As will be understood by those skilled in the art, various modifications of the invention can be made or practiced in view of the above disclosure without departing from the spirit or scope of the invention.

I claim:

1. In a method of prospecting for subterranean oil and gas deposits wherein samples of soil from spaced points in the area under investigation are analyzed for the presence of hydrocarbon-consuming microorganisms whose presence is indicative of subterranean oil and gas deposits, the improvement which comprises: subjecting an aliquot portion of each of said samples to the action of a phenolic compound selected from the group consisting of phenolic compounds characterized by the following structural formulas

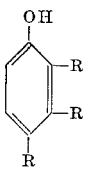 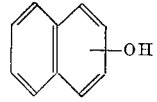

wherein each R is selected from the group consisting of a hydrogen atom, an OH group, and a methyl group, and not more than one R is other than hydrogen, as the sole substrate in a culture medium under incubating conditions for a period of time sufficient to permit growth of said microorganisms; and examining said culture medium for evidence of said growth.

2. In a method of prospecting for subterranean petroleum oil and gas deposits wherein samples of soil from spaced points in the area under investigation are analyzed for the presence of hydrocarbon-consuming microorganisms whose presence is indicative of subsurface petroleum oil and gas deposits, the improvement which comprises: subjecting an aliquot portion of each of said samples to the action of phenol as the sole substrate in a culture medium under incubating conditions for a period of time sufficient to permit growth of said microorganisms; and examining said culture medium for evidence of said growth.

3. In a method of prospecting for subterranean petroleum oil and gas deposits wherein samples of soil from spaced points in the area under investigation are analyzed for the presence of hydrocarbon-consuming microorganisms whose presence is indicative of subsurface petroleum oil and gas deposits, the improvement which comprises: subjecting an aliquot portion of each of said samples to the action of ortho cresol as the sole substrate in a culture medium under incubating conditions for a period of time sufficient to permit growth of said microorganisms; and examining said culture medium for evidence of said growth.

4. In a method of prospecting for subterranean petroleum oil and gas deposits wherein samples of soil from spaced points in the area under investigation are analyzed for the presence of hydrocarbon-consuming microorganisms whose presence is indicative of subsurface petroleum oil and gas deposits, the improvement which comprises: subjecting an aliquot portion of each of said samples to the action of meta cresol as the sole substrate in a culture medium under incubating conditions for a period of time sufficient to permit growth of said microorganisms; and examining said culture medium for evidence of said growth.

5. In a method of prospecting for subterranean petroleum oil and gas deposits wherein samples of soil from spaced points in the area under investigation are analyzed for the presence of hydrocarbon-consuming microorganisms whose presence is indicative of subsurface petroleum oil and gas deposits, the improvement which comprises: subjecting an aliquot portion of each of said samples to the action of para cresol as the sole substrate in a culture medium under incubating conditions for a period of time sufficient to permit growth of said microorganisms; and examining said culture medium for evidence of said growth.

6. A method of prospecting for subterranean petroleum oil and gas deposits, which method comprises: collecting samples of soil from spaced points in the area under investigation; forming a suspension of each of said samples in an aqueous sterile inorganic salt medium; incorporating an aliquot of each of said suspensions in individual portions of a culture medium containing, as the sole substrate therein, a phenolic compound selected from the group consisting of phenolic compounds characterized by one of the following structural formulas

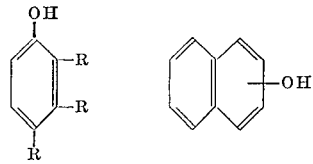

wherein each R is selected from the group consisting of a hydrogen atom, an OH group, and a methyl group, and not more than one R is other than hydrogen; maintaining said portions of culture medium thus inoculated under incubating conditions for a period of time sufficient to permit growth of hydrocarbon-consuming microorganisms whose presence is indicative of subsurface petroleum oil and gas deposits; and examining said incubated cultures for evidence of said growth.

7. A method of prospecting for subterranean petroleum oil and gas deposits, which method comprises: collecting samples of soil from spaced points in the area under investigation; forming a suspension of each of said samples in an aqueous sterile inorganic salt medium; incorporating an aliquot of each of said suspensions in individual portions of a culture medium containing, as the sole substrate therein, from 5 to 100 parts per million by weight of a phenolic compound selected from the group consisting of phenolic compounds characterized by one of the following structural formulas

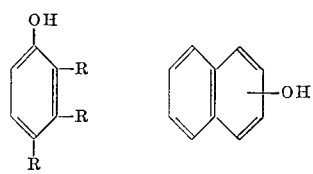

wherein each R is selected from the group consisting of a hydrogen atom, an OH group, and a methyl group, and not more than one R is other than hydrogen; maintaining said portions of culture medium thus inoculated under incubating conditions for a period of time sufficient to permit growth of hydrocarbon-consuming microorganisms whose presence is indicative of subsurface petroleum oil and gas deposits; and examining said incubated cultures for evidence of said growth.

8. A method according to claim 7 wherein said phenolic compound is phenol.

No references cited.

A. LOUIS MONECELL, *Primary Examiner.*

ALVIN E. TANENHOLTZ, *Examiner.*